(12) United States Patent
Miller et al.

(10) Patent No.: US 11,640,578 B2
(45) Date of Patent: *May 2, 2023

(54) BREAK-BASED INVENTORY FORECASTING

(71) Applicant: Xandr Inc., New York, NY (US)

(72) Inventors: Craig Miller, Louisville, CO (US); Charles Douglas Cosman, Boulder, CO (US); Thomas Evenson, Longmont, CO (US); Eric Smith, Louisville, CO (US); Calvin Legh, Lafayette, CO (US); Thomas Shields, Hillsborough, CA (US); Aaron Martin, Arvada, CO (US)

(73) Assignee: Xandr Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/244,537

(22) Filed: Apr. 29, 2021

(65) Prior Publication Data
US 2021/0248551 A1 Aug. 12, 2021

Related U.S. Application Data

(63) Continuation of application No. 16/865,595, filed on May 4, 2020, now Pat. No. 11,023,853, which is a continuation of application No. 15/634,468, filed on Jun. 27, 2017, now Pat. No. 10,685,321.

(51) Int. Cl.
*G06Q 10/08* (2012.01)
*G06Q 30/00* (2012.01)
*G06Q 30/02* (2012.01)
*G06Q 10/087* (2023.01)

(52) U.S. Cl.
CPC .......... *G06Q 10/087* (2013.01); *G06Q 30/00* (2013.01); *G06Q 30/02* (2013.01)

(58) Field of Classification Search
CPC ....... G06Q 10/087; G06Q 30/00; G06Q 30/02
See application file for complete search history.

(56) References Cited

U.S. PATENT DOCUMENTS

| 8,280,765 | B2 | 10/2012 | Shields et al. |
| 8,316,392 | B2 | 11/2012 | Ahanger et al. |
| 8,392,248 | B2 | 3/2013 | Cosman |
| 8,412,572 | B2 | 4/2013 | Cosman |
| 9,082,138 | B2 | 7/2015 | Cosman |

(Continued)

OTHER PUBLICATIONS

STIC Search Report—Completed Dec. 31, 2018.

*Primary Examiner* — A. Hunter Wilder

(57) ABSTRACT

Techniques are disclosed for advantageously forecasting an inventory of a product having a particular duration (e.g., video content). The technique can include determining the particular configuration (e.g., maximum number of impressions, maximum amount of time permitted) of breaks identified within an impression log. Based on the number of breaks and the configurations of the breaks, the technique can forecast a future inventory of the product. In some implementations, the disclosed technique can identify an amount of a previous break that was not filled with video content. These forecasts can enable product sellers to better communicate with their customers, negotiate supply contracts, price their products, plan for business operations, etc.

19 Claims, 5 Drawing Sheets

(56) References Cited

U.S. PATENT DOCUMENTS

| | | |
|---|---|---|
| 9,092,807 B1 | 7/2015 | Cosman |
| 9,681,199 B2 | 6/2017 | Jain et al. |
| 10,410,237 B1 | 9/2019 | Barnes et al. |
| 2007/0113244 A1 | 5/2007 | Verschueren et al. |
| 2008/0250448 A1 | 10/2008 | Rowe et al. |
| 2009/0099902 A1* | 4/2009 | Chatter ............ G06Q 30/0275 |
| | | 705/14.43 |
| 2010/0082422 A1 | 4/2010 | Heilig et al. |
| 2010/0114710 A1 | 5/2010 | Agarwal et al. |
| 2010/0175079 A1 | 7/2010 | Braun et al. |
| 2010/0318418 A1 | 12/2010 | Wertheimer et al. |
| 2011/0029377 A1 | 2/2011 | Chen et al. |
| 2011/0035276 A1 | 2/2011 | Ghosh et al. |
| 2011/0119136 A1 | 5/2011 | Eldreth et al. |
| 2011/0258045 A1 | 10/2011 | Chickering et al. |
| 2011/0295683 A1 | 12/2011 | Mak |
| 2012/0124618 A1 | 5/2012 | Ruiz-velasco et al. |
| 2012/0158493 A1 | 6/2012 | Yemeni et al. |
| 2014/0082660 A1 | 3/2014 | Zhang et al. |
| 2014/0089080 A1 | 3/2014 | Tajima et al. |
| 2015/0199709 A1 | 7/2015 | Cosman |
| 2016/0358232 A1 | 12/2016 | Wang et al. |
| 2017/0098236 A1 | 4/2017 | Lee et al. |
| 2017/0124589 A1 | 5/2017 | Chaar et al. |
| 2017/0208370 A1 | 7/2017 | Ray et al. |
| 2017/0289600 A1 | 10/2017 | Carbajal Orozco et al. |
| 2018/0241981 A1 | 8/2018 | Berger et al. |
| 2018/0374035 A1 | 12/2018 | Miller et al. |
| 2020/0334623 A1 | 10/2020 | Miller et al. |

\* cited by examiner

```
400
  pod_position==0,video_position=0,size=300x250,creative_size=300x250,creative_id=38048731663,ad_unit_id=73882303
  pod_position==0,video_position=0,size=300x250,creative_size=300x250,creative_id=58710198343,ad_unit_id=74218063
  pod_position==0,video_position=0,size=300x250,creative_size=300x250,creative_id=58710198343,ad_unit_id=76130743
  pod_position==1,video_position=1,size=,creative_size=,creative_id=0,ad_unit_id=74210623
  pod_position==0,video_position=0,size=320x50,creative_size=320x50,creative_id=58709734663,ad_unit_id=82124503
  pod_position==0,video_position=0,size=300x250,creative_size=300x250,creative_id=58712184823,ad_unit_id=74295703
  pod_position==0,video_position=0,size=300x125,creative_size=300x125,creative_id=58712179783,ad_unit_id=67361503
  pod_position==0,video_position=0,size=300x600,creative_size=300x600,creative_id=53830128703,ad_unit_id=72038143
  pod_position==0,video_position=0,size=300x600,creative_size=300x600,creative_id=58709405383,ad_unit_id=76130743
  pod_position==0,video_position=0,size=728x90,creative_size=728x90,creative_id=38048722063,ad_unit_id=72885463
  pod_position==0,video_position=0,size=300x250,creative_size=300x250,creative_id=58712214103,ad_unit_id=74218063
  pod_position==2,video_position=7,size=852x480v,creative_size=852x480v,creative_id=58712219623,ad_unit_id=74210623
  pod_position==0,video_position=0,size=300x250,creative_size=300x250,creative_id=58711073143,ad_unit_id=67361503
  pod_position==0,video_position=0,size=300x250,creative_size=300x250,creative_id=58710834423,ad_unit_id=74218063
  pod_position==0,video_position=0,size=728x90,creative_size=728x90,creative_id=38048722063,ad_unit_id=80643583
  pod_position==0,video_position=0,size=,creative_size=,creative_id=0,ad_unit_id=99767263
  pod_position==0,video_position=0,size=728x90,creative_size=728x90,creative_id=58710834103,ad_unit_id=74210623
  pod_position==1,video_position=8,size=,creative_size=,creative_id=0,ad_unit_id=102772543
402 pod_position==1,video_position=5,size=852x480v,creative_size=852x480v,creative_id=58712214823,ad_unit_id=102774223
  pod_position==0,video_position=0,size=300x250,creative_size=300x250,creative_id=40068253303,ad_unit_id=67361503
  pod_position==2,video_position=1,size=852x480v,creative_size=852x480v,creative_id=58709768263,ad_unit_id=74210623
  pod_position==0,video_position=0,size=320x50,creative_size=320x50,creative_id=58712083783,ad_unit_id=76130743
  pod_position==0,video_position=0,size=728x90,creative_size=728x90,creative_id=58710274183,ad_unit_id=76130743
  pod_position==0,video_position=0,size=320x50,creative_size=320x50,creative_id=45093157183,ad_unit_id=73261903
  pod_position==0,video_position=0,size=300x250,creative_size=300x250,creative_id=38048731663,ad_unit_id=72038263
  pod_position==0,video_position=0,size=728x90,creative_size=728x90,creative_id=38048722063,ad_unit_id=72857503
  pod_position==0,video_position=0,size=320x50,creative_size=320x50,creative_id=58711888663,ad_unit_id=76130743
  pod_position==0,video_position=0,size=300x250,creative_size=300x250,creative_id=40068253303,ad_unit_id=67361503
  pod_position==0,video_position=0,size=300x250,creative_size=300x250,creative_id=58711396903,ad_unit_id=74218063
  pod_position==0,video_position=0,size=728x90,creative_size=728x90,creative_id=38048722063,ad_unit_id=80643583
  pod_position==0,video_position=0,size=300x600,creative_size=300x600,creative_id=58709405383,ad_unit_id=76130743
402 pod_position==1,video_position=1,size=852x480v,creative_size=852x480v,creative_id=58711901143,ad_unit_id=74210623
  pod_position==0,video_position=0,size=300x250,creative_size=300x250,creative_id=38048731663,ad_unit_id=96569143
  pod_position==0,video_position=0,size=300x250,creative_size=300x250,creative_id=58710827623,ad_unit_id=74210623
  pod_position==0,video_position=0,size=300x250,creative_size=300x250,creative_id=40068253303,ad_unit_id=67361503
  pod_position==0,video_position=0,size=300x250,creative_size=300x250,creative_id=38048731663,ad_unit_id=71279023
  pod_position==0,video_position=0,size=300x600,creative_size=300x600,creative_id=53830128703,ad_unit_id=71279023
```

FIG. 4

BREAK-BASED INVENTORY FORECASTING

CROSS-REFERENCE TO RELATED APPLICATIONS

This application is a continuation of U.S. patent application Ser. No. 16/865,595 filed May 4, 2020, pending, which is a continuation of U.S. patent application Ser. No. 15/634,468 filed Jun. 27, 2017 (now U.S. Pat. No. 10,685,321). All sections of the aforementioned applications and patents are incorporated herein by reference in their entirety.

TECHNICAL FIELD

This specification relates to the forecasting of product inventory and, more particularly, to forecasting inventory having a particular duration that is allocated within a break of a particular duration.

BACKGROUND

The ability to accurately forecast inventory is important for many product selling businesses. An accurate forecast allows a product seller to know what it can commit to sell to a buyer, which affects the negotiation of many supply contracts. Originally, forecasting inventory required a seller to determine an amount of physical goods it had at its disposal (e.g., in a warehouse, etc.). This task has become much more complex in the internet-age, in which products available for sale are not always physical goods. For example, online content publishers often sell space on their webpages as products. As such, rather than determining an amount of physical goods sitting in a warehouse, the inventory forecast involves projecting the number of viewers (in some cases, meeting certain targeting attributes) that will view the website. The forecast is further complicated by the fact that the criteria for multiple orders for webpage space ("order lines") can be satisfied by a single webpage viewer; and, given that each webpage has a finite amount of space to sell, the sale of space to one order line necessarily takes inventory away from the other order lines (a concept sometimes referred to as "cannibalization").

A common metric in forecasting webpage space is an impression. In general, an impression is the presentation of a particular creative to a viewer. Traditionally, forecasting webpage space inventory (sometimes referred to herein as "capacity") has focused on a pure static impressions-based model (sometimes referred to herein as the "traditional model"), in which solely a determination of past impressions to particular viewers is used to forecast the number of future impressions.

U.S. Pat. Nos. 9,092,807; 8,392,248; 8,412,572; and 9,082,138, which largely share a common specification, and all of which are incorporated by reference herein in their entireties, provide a detailed description of a pure impressions-based forecast model. The model works well when the impressions are static, because the number of past impressions provides a reliable indication of past inventory.

In more recent times, video-based content has become much more popular and is being distributed much more frequently over the internet. As such, in addition to (or as an alternative from) static content (e.g., sidebar windows, banner windows, etc.), publishers are now selling portions of the video space to buyers. However, for reasons discussed below, the forecasting models have some limitations when forecasting video content. As such, there is a need for an improved forecasting technique better suited to forecasting non-static (e.g., video-based) inventory.

SUMMARY

Implementations of the subject matter described in this disclosure include an improved technique for forecasting future inventory of products having a duration-based attribute (e.g., video content). Certain implementations can realize the advantage of providing video content sellers with an improved forecast of their future inventory, which can afford them improved information when communicating with their customers, negotiations supply contracts, pricing products, planning business operations, etc.

In general, one aspect of the subject matter described in this specification can be embodied in methods for forecasting a future inventory of a product having at least one targeting attribute and a duration attribute. The method can include the actions of identifying at least one break within an impression log associated with the targeting attribute(s); determining a configuration for each of the identified breaks; and based on a count of identified breaks and the determined configuration for each identified break, forecasting the future inventory for the product. Other embodiments of this aspect include corresponding systems, apparatus, and computer programs.

These and other aspects can optionally include one or more of the following features. The targeting attribute(s) can include a characteristic of a viewer of the product and/or the duration attribute can include a run time of the product. The run time of the product can be 15 seconds, 30 seconds, 45 seconds, and/or 1 minute. In some cases, the configuration for each of the identified breaks can include (i) a maximum number of permitted impressions and/or (ii) a maximum amount of permitted time.

In some implementations forecasting the future inventory includes using the following equation: minimum(the maximum number of permitted impressions, ((the maximum amount of permitted time)/(the duration attribute)))*the count of identified breaks. The method can also include determining a future availability of the product by reducing the forecasted future inventory based on at least one of an existing and a predicted order line. The method can also include representing at least one of the forecasted future inventories and the future availability as (i) a number of impressions and/or (ii) an amount of time. In some instances, identifying at least one break within an impression log can include identifying lines in the impression log having a criteria indicative of a break. In some instances, determining the configuration for each of the identified breaks can include wherein identifying at least one configuration comprising a targeting expression corresponding to the identified break.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 4 is a portion of an example impression log; and

DETAILED DESCRIPTION

Figure 1:
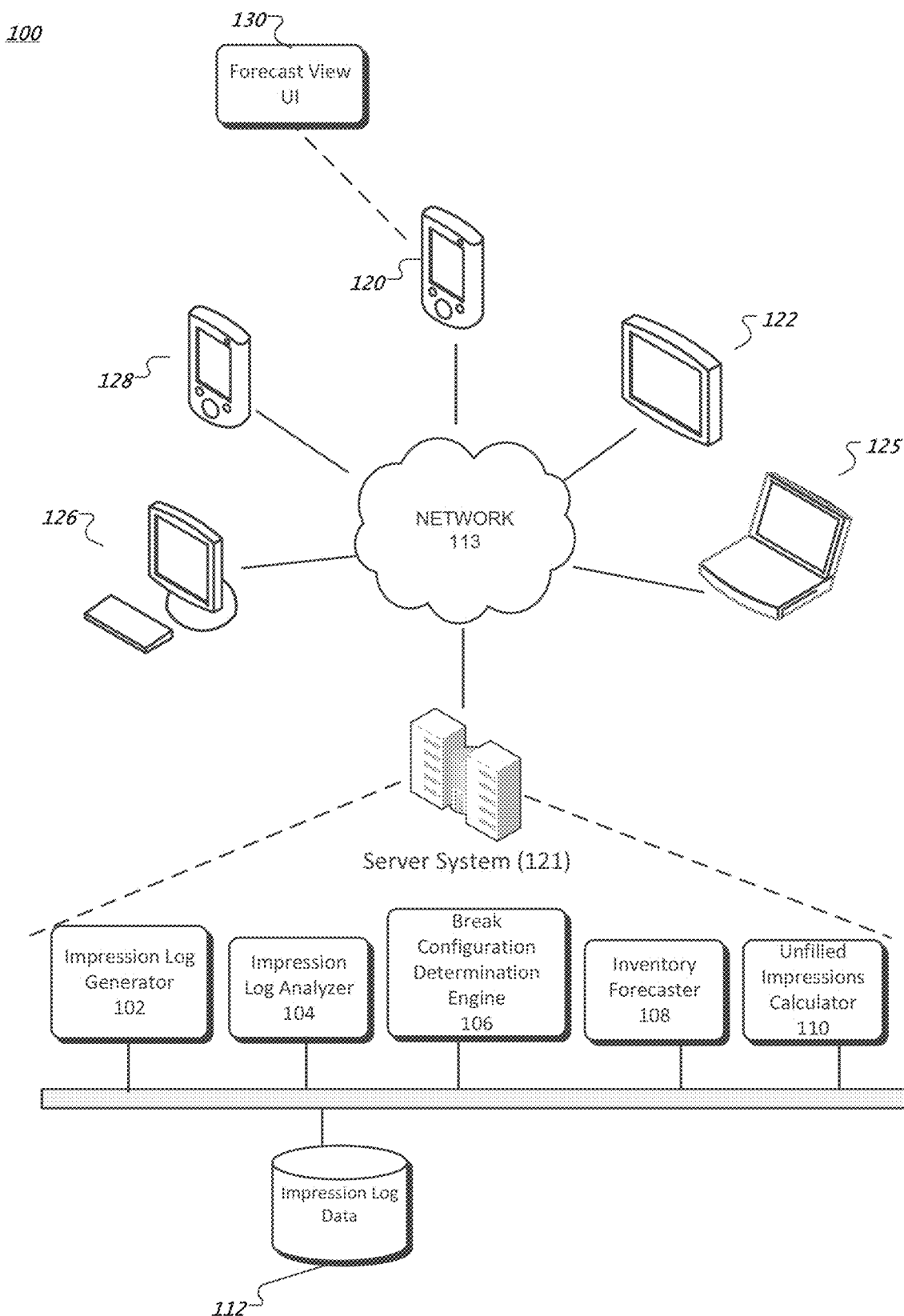
FIG. 1 is a schematic diagram of a system used to determine and deliver inventory forecasts, according to various implementations.

In various implementations, this disclosure relates to an improved technique for forecasting video-based inventory. FIG. 1 illustrates an example content forecasting system 100. The system 100 comprises hardware components, software components and databases that can be deployed at one or more data centers in one or more geographic locations, for example. In some instances, certain components are hosted on third-party servers. One or more client devices (e.g., client devices 120, 122, 125, 126 and 128) such as laptop computers, smart phones, tablet computers or desktop computers make requests and receive responses from a server system 121 through network 113. The network 113 can be one or more public or private data communication networks such as the Internet, for example. The communication protocol used by the client devices to communicate with the server system 121 can be HTTP (Hypertext Transfer Protocol) or any other suitable protocol.

In various implementations, each client device includes a forecast view user interface (UI) 130 that displays forecast content to a user. The user can be a content publisher seeking forecast information, for example. The UI 130 can be implemented as a web page or as a stand-alone application that executes atop operating system software on the client devices.

In various implementations, the server system 121 components comprise an impression log generator 102, an impression log analyzer 104, a break configuration determination engine 106, an inventory forecaster 108, and/or an unfilled impressions calculator 110. The software components can comprise subcomponents that can execute on the same or on different individual data processing apparatus. The software components can also use content and/or data drawn from a variety of sources. As a non-limiting example, the server system 121 can include and/or have access to an impression log data database 112, described in more detail below. The databases can reside in one or more physical storage systems and can be implemented as relational databases, flat files, object-oriented databases, or combinations of these.

Figure 2:
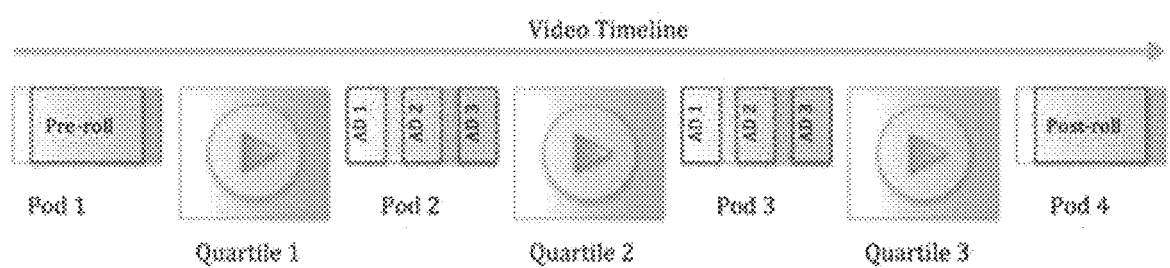
FIG. 2 is a schematic illustration of various video content configurations, according to various implementations.

FIG. 2 is a schematic illustration of various configurations of video content. Generally, the video content will include primary content (e.g., news clip, television show, etc.) and secondary content (e.g., advertisement) arranged in various orders. In this disclosure, secondary content will often be referred to as advertisements (or "ads"), but the same or similar concepts are also applicable to any other type of secondary content. In some cases, primary video content will be displayed to viewers in segments (quartiles 1-3 in FIG. 2) that are broken up by pods or "breaks" that show ads. In other cases, the ad breaks can appear at the beginning and/or end of the primary content. Each break can be divided up to show multiple ads, or a break can be configured to show a single ad.

Traditionally, static impression inventory has been forecast based on a review of impression logs, which indicate a number of impressions presented to viewers having particular attributes over a particular prior time period. The theory is that actual prior impressions provide a good baseline for determining actual prior capacity (from which future capacity can be predicted), because, with static impressions, there is no reason for a publisher to have unfilled capacity and, thus, actual impressions and capacity will be relatively close. The same assumption does not necessarily apply for video content.

A significant challenge with forecasting video content inventory comes from the fact that prior actual impressions do not necessarily provide an accurate estimate of prior capacity. This is because breaks are typically configured with certain constraints, e.g., to ensure that the primary content is not too adversely affected for a viewer. For example, a break can be impression limited, which means that only a certain number of separate impressions (e.g., separate ads) are permitted to run during the break, regardless of how long the break runs. As another example, the break can be time limited, which means that the break can only take up a certain maximum amount of time, regardless of how many impressions are presented. In addition, each impression can have a maximum permitted time, as well. Many other break constraints are possible and contemplated. In some implementations, breaks have two or more constraints, the most common example being a dual-constrained break that is both impression limited and time limited.

The constraints placed upon breaks, coupled with the fact that video content can be of different lengths (e.g., 15 seconds, 30 seconds, 45 seconds, 1 minute, etc.) can sometimes result in a discrepancy between prior actual impressions logged and prior capacity. A simple example serves to illustrate. Imagine that a break is configured to allow up to a maximum of 30 seconds and 2 impressions, and that a video ad server has already scheduled a 15 second ad. In this circumstance, if the only other ad available to play in this break is a 30 second ad, then it would not be shown because it would violate the constraints of the break and, accordingly, would not be reflected in an impression log. As such, the final 15 seconds of the break would go unused.

Thus, a simple review of the impression log would reveal only a single impression. If the traditional model of equating actual impressions with capacity were used, the result would be a prediction that the prior capacity was one impression. However, this model would fail to account for the 15 unfilled seconds, and underestimate prior capacity by that amount. To take the example a step further, imagine a customer approached the producer wanting to buy two 15 second ad slots in the mentioned break. Under the traditional pure impression-based analysis, the publisher would tell the consumer that it only had an inventory of one impression (assuming the publisher directly correlated prior capacity with future capacity), and that it could not sell the customer two impressions. However, the publisher would have a capacity for two 15 second impressions, it just could not determine it under the traditional model. As a result, the publisher would lose the sale of at least one impression.

This example illustrates at least two drawbacks of pure impression-based forecasts. First, pure impression-based forecasts can fail to account for certain video-based inventory (e.g., the 15 seconds described above). Second, pure impressions-based forecasting does not differentiate between impressions of different lengths (e.g., a 15 second ad vs. a 30 second ad). In some instances, it can be helpful for a publisher to know the inventory of ads of different lengths. Not only does this provide the publisher greater knowledge of its inventory but, in some instances, it can enable the publisher to charge different amounts for ads of different length. For example, it may have been helpful for the publisher in the above example to know that his inventory for 30 second ad slots was 0, but his inventory for 15 second ad slots was one.

The above example is clearly a trivial example with only a single break and 15 unfilled seconds. Once can imagine however that as the example is extrapolated to thousands and millions of breaks, that the discrepancies between forecasts and reality, and the associated lost revenue, can magnify greatly. As described below, the techniques described in this disclosure provide solutions to these drawbacks, and others. In some instances, the techniques described herein can be used in addition to (or as an alternative to) traditional models, for an enhanced forecast.

In various implementations, the improved forecasting technique described herein can also use impression logs, but with additional/different analysis than is done by traditional models. As such, server system 121 can feature an impression log generator 102. The impression log generator 102 can access impression log data database 112 to compile impression logs. The impression log data database 112 can store received data indicating when impressions were served to particular viewers and the characteristics (or attributes) of such viewers. The impression data can be initially recorded by the client device that displays the impressions to a viewer (e.g., client devices 120, 122, 125, 126, and 128, or another client device not depicted). The client device can then transmit the impression data to the impression log data database 112. In some cases, the impression data can be sent to an intermediate server (e.g., an ad server) before being sent to the impression log data database 112 of server system 121.

In various implementations, the impression log generator 102 can access the impression log data database 112 and organize the raw data into analyzable impression logs. An impression log can be a data structure that lists the content presented to particular viewers (e.g., meeting certain targeting attributes) during certain durations of time. As used herein, targeting attributes refer to particular characteristics of viewers, e.g., that an ad purchaser may be interested in targeting. For example, targeting attributes can include age, sex, interests, profession, etc. Many other examples of targeting attributes are possible and contemplated.

As an example, if a user of the forecast view UI 130 (e.g., a content publisher) is interested in forecasting future inventory for an advertising campaign directed at males between ages 30-40 who are interested in fishing, the impression log generator 102 can generate an impression log of prior content that has been presented to viewers having these targeting attributes. Similarly, as another example, if the content publisher is interested in determining future inventory for an advertising campaign directed at females between ages 20-30 that drive SUVs, the impression log generator 102 can generate an impression log of prior content that has been presented to viewers having these targeting attributes.

In addition to targeting attributes, the technique described herein can also use a content duration attribute (e.g., run time) as a forecasting parameter. For example, a forecast parameter can be the run time of the ad (e.g., 15 seconds, 30 seconds, etc.) As one example, a forecast can be run for 15 second ad inventory that targets 30-40-year-old men interested in fishing.

In various implementations, in order to forecast a future inventory of a product having certain targeting attributes and a duration attribute, the impression log analyzer 104 can analyze an impression log (generated by log generator 102) for viewers meeting the targeting attributes. The impression log analyzer 104 can analyze the impression log to identify signatures that indicate a break. In general, the signature can be anything capable of identifying the break. The impression log analyzer 104 can then determine a count of breaks that occur in the impression logs. This process is similar to the traditional model, except instead of counting static impressions, the impression log analyzer 104 counts breaks. In various implementations, once a break is identified, the break configuration determination engine 106 can attribute a configuration to the break (e.g., maximum number of impressions permitted, maximum amount of time permitted, etc.).

FIG. 4 shows a portion of an example impression log 400 that demonstrates an example technique for identifying a break. The impression log 400 includes data indicative of impressions that were served (or attempted to be served) on a viewer. In this example impression log 400, the bolded lines 402 indicate the beginning of a break. In general, the impression log analyzer 104 is configurable to identify the beginning of a break based on any signature, such that is can be compatible with various ad servers. In the example impression log 400, the signature of bolded lines 402 used to identify them as being the beginning of a break includes 2 attributes: (1) the pod_position field has a value of "1" (indicating that this impression was the first video in a particular break) and (2) the size field is followed by a "v" (e.g., 852×480v) (indicating that a valid video impression was served).

In various embodiments, a particular video configuration is attributed to an identified break based on the break's targeting expression. Once a break is identified, the impression log analyzer 104 can identify all video configurations that have a targeting expression that evaluates to true for the identified break. As one example, a targeting expression of a video configuration that evaluates to true for the first bolded break 402 in impression log 400 can be as follows: ad_unit_id_in ('102774223') and pod_position ! in ('0') and size in ('852×480v') and video_position in ('1'). As another example, a targeting expression that evaluates to true for the second bolded break 402 in impression log 400 can be as follows: ad_unit_id_in ('74210623') and pod_position ! in ('0') and size in ('852×480v') and video_position in ('1'). If only a single video configuration has a targeting expression that evaluates to true for a particular identified break, then that video configuration is attributed to the break. If multiple video configurations have a targeting expression that evaluates to true for a particular identified break, then the video configuration with the highest priority is attributed to the break. If multiple video configurations have a targeting expression that evaluates to true for a particular identified break, and each configuration has the same priority, then a video configuration can be arbitrarily selected from this group and attributed to the break.

One of the challenges with break-based forecasting is that the forecast can change (sometimes drastically) if a publisher changes the configurations of the breaks. In various implementations, the technique described herein addresses this challenge by taking account of the break configuration when calculating the forecast.

In various implementations, the data from the impression log analyzer 104 can be used by the unfilled impressions calculator 110 to calculate a previous number of unfilled impressions. In some cases, as used herein, an unfilled impression is an impression for which there was capacity but that was not actually presented to a viewer. As one example, the 15 unused seconds in the above example is an unfilled 15 second impression.

In various implementations, once the number of breaks and break configurations are known, the inventory forecaster 108 can use this information to calculate a maximum prior impressions inventory for an ad having the relevant duration attribute during the prior reference period (i.e., the period covered by the impression log). In some instances, the inventory forecaster 108 can use the following equation:

minimum(the maximum number of permitted impressions,((the maximum amount of permitted time)/(the duration attribute)))*the count of identified breaks Once the maximum number of prior impressions is known, the inventory forecaster 108 can use this value to forecast what the future inventory will be. In some cases, a direct 1:1 correlation between prior inventory and future inventory is assumed. In other cases, a multiplier (up or down) is applied to the prior inventory to reflect changed conditions (e.g., market conditions, internet traffic conditions, etc.).

In some instances, the inventory forecaster 108 can use the number of unfilled impressions calculated by the unfilled impressions calculator 110 to determine the forecast of future inventory. In some cases, the full amount of unfilled impressions can be included in the forecast. However, publishers may still encounter a situation in which the forecast unfilled inventory can accommodate ads of certain lengths but not ads of other lengths, which, under some conditions, can result in some future unfilled inventory. (e.g., the example situation described above, where there is a 15 second slot available, but the only ad meeting the targeting criteria is a 30 second ad). As such, adding the full amount of unfilled impressions to the forecast can result in an over forecast, which can have negative effects for the publisher and its customers. On the other hand, not including the unfilled impressions can result in under forecasting inventory which, as evidenced by the above example, can result in lost revenue.

To address this challenge, in some cases, the inventory forecaster 108 includes a certain predetermined percentage of unfilled impressions in its forecast. In some examples, the inventory forecaster 108 assumes that the unfilled impressions will be filled with ads in the same proportion as represented in the impression logs. For example, if the impression logs include 50% 15 second ads and 50% 30 second ads, then the inventory forecaster 108 assumes that the unfilled impressions will be filled with 50% 15 second ads and 50% 30 second ads, as well, in determining its forecast.

In various implementations, the data derived from the inventory forecaster 108 can be used to build prototype models (e.g., days, weeks, months, etc.). In general, a prototype week (or other time period) represents the forecasted capacity for a particular set of targeting attributes. For example, a prototype week can be a data set that includes the following information for each day of the prototype week: [day-of-week identifier, target-criteria-identifier, event count]. U.S. Pat. Nos. 9,092,807; 8,392,248; 8,412,572; and 9,082,138, all of which are incorporated herein by reference in their entireties, provide a more detailed description of prototype weeks. In the incorporated patents, the event is typically a static impression. For the break-based forecasting technique described herein, the event is typically a break.

In various implementations, it can be advantageous to forecast not only a future amount of inventory, but also the availability of that inventory. In general, this can be done by reducing forecasted capacity by existing (or, in some cases, predicted) order lines. The process requires accounting for the effects of cannibalization and allocating order lines among various targets. This process is described in much greater detail in U.S. Pat. Nos. 9,092,807; 8,392,248; 8,412,572; and 9,082,138, all of which are incorporated herein by reference in their entireties.

In various implementations, the information determined by the inventory forecaster 108 and other server system 121 modules can be used to generic metrics. These metrics can then be communicated to a client device, where they can be represented on the forecast view UI 130. In general, the metrics can be any of the above-described identified, determined, or calculated values, and any values that can be derived therefrom. For example, the communicated metrics can include future video impression inventory, future video time inventory, future available impression inventory, future available time inventory. These metrics can be computed and represented for any future duration (e.g., a day, a week, a month, a year, etc.). The metrics can also include historical information, e.g., historical impression inventory, historical time inventory, etc.

Figure 3:
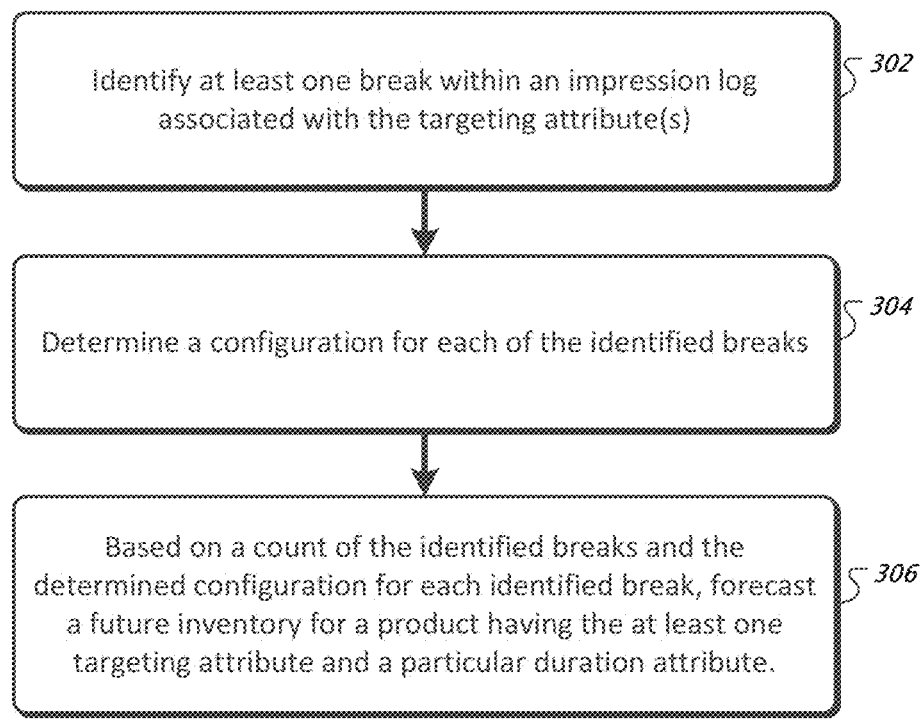
FIG. 3 is a flow chart of an example method for forecasting inventory.

FIG. 3 is a flow chart of an example method 300 for forecasting a future inventory of a product having at least one targeting attribute and a duration attribute. The method can include identifying at least one break within an impression log associated with the targeting attribute(s) (302); determining a configuration for each of the identified breaks (304); and based on a count of the identified breaks and the determined configuration for each identified break, forecasting a future inventory for a product having the targeting attribute(s) and the duration attribute (306).

Operating Apparatus

Figure 5:
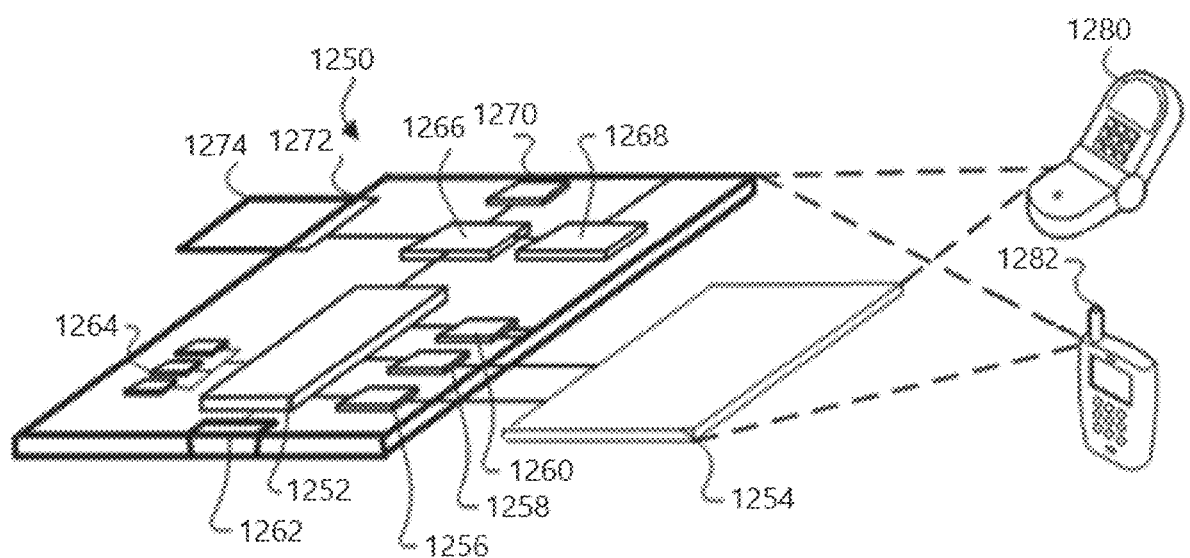
FIG. 5 illustrates an example client device that can be used in certain implementations.

FIG. 5 shows an example of a generic computing device 1250, which may be used with the techniques described in this disclosure. Computing device 550 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can execute instructions within the computing device 1250, including instructions stored in the memory 1264. The processor may be implemented as a chipset of chips that include separate and multiple analog and digital processors. The processor may provide, for example, for coordination of the other components of the device 1250, such as control of user interfaces, applications run by device 1250, and wireless communication by device 1250.

Processor 1252 may communicate with a user through control interface 1258 and display interface 1256 coupled to a display 1254. The display 1254 may be, for example, a TFT LCD (Thin-Film-Transistor Liquid Crystal Display) or an OLED (Organic Light Emitting Diode) display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may be provided in communication with processor 1252, to enable near area communication of device 1250 with other devices. External interface 1262 may provide, for example, for wired communication in some implementations, or for wireless communication in other implementations, and multiple interfaces may also be used.

The memory 1264 stores information within the computing device 1250. The memory 1264 can be implemented as one or more of a computer-readable medium or media, a volatile memory unit or units, or a non-volatile memory unit or units. Expansion memory 1274 may also be provided and connected to device 1250 through expansion interface 1272, which may include, for example, a SIMM (Single In Line Memory Module) card interface. Such expansion memory 1274 may provide extra storage space for device 1250 or may also store applications or other information for device 1250. Specifically, expansion memory 1274 may include instructions to carry out or supplement the processes described above and may include secure information also. Thus, for example, expansion memory 1274 may be provided as a security module for device 1250 and may be programmed with instructions that permit secure use of device 1250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, memory on processor 1252, or a propagated signal that may be received, for example, over transceiver 1268 or external interface 1262.

Device 1250 may communicate wirelessly through communication interface 1266, which may include digital signal processing circuitry where necessary. Communication interface 1266 may in some cases be a cellular modem. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, Wi-Fi, or other such transceiver (not shown). In addition, GPS (Global Positioning System) receiver module 1270 may provide additional navigation- and location-related wireless data to device 1250, which may be used as appropriate by applications running on device 1250.

Device 1250 may also communicate audibly using audio codec 1260, which may receive spoken information from a user and convert it to usable digital information. Audio codec 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250.

The computing device 1250 may be implemented in several different forms, as shown in FIG. 5. For example, it may be implemented as a cellular telephone 1280. It may also be implemented as part of a smartphone 1282, smart watch, personal digital assistant, or other similar mobile device.

Operating Environment

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method, comprising:
   receiving, by a processor, raw data associated with displayed video content over a communication network, wherein the raw data includes impressions observed by a viewer or times of the impressions served to the viewer;

storing, in an impression log data database, the raw data;

generating, by an impression log generator of the processor, an analyzable impression log from the raw data associated with the displayed video content presented to target viewers of video content having a group of viewer attributes, wherein the analyzable impression log includes the impressions observed by a target attribute including the viewer;

identifying, by the processor, signatures comprising lines within the analyzable impression log comprising a criteria indicative of breaks within the displayed video content, resulting in identified breaks, wherein the identified breaks correspond to the times of the impressions served to the viewer either preceding or proceeding a segment associated with primary content;

determining, by the processor, configuration constraints associated with the identified breaks, wherein the configuration constraints comprise a maximum number of permitted impressions, and a maximum amount of permitted time for a permitted impression in each of the identified breaks;

calculating, by the processor, a maximum prior impressions inventory during a time period of the analyzable impression log based on the maximum number of permitted impressions, the maximum amount of permitted time for each permitted impression in each of the identified breaks, a count of the identified breaks, and a run time of a video advertising campaign;

based on the calculating of the maximum prior impressions inventory, providing, by the processor and over the communication network, a forecast for the video advertising campaign of a future inventory of a product having a duration-based attribute, wherein the forecast is based on a determination of a change in network traffic conditions; and causing, by the processor, display of the forecast for the video advertising campaign of the future inventory of a product having the duration-based attribute, using a forecast view user interface of a video content publisher device.

2. The method of claim 1, wherein the providing a forecast of the future inventory comprises applying a multiplier to the maximum prior impressions inventory.

3. The method of claim 1, further comprising adjusting the forecast of the future inventory according to a predetermined percentage of unfilled impressions in a same proportion as represented in the analyzable impression log.

4. The method of claim 1, wherein the run time is selected from a group consisting of 15 seconds, 30 seconds, 45 seconds, and 1 minute.

5. The method of claim 1, further comprising analyzing the analyzable impression log, wherein the analyzing of the analyzable impression log is based on a pod position field and a size field.

6. The method of claim 1, further comprising:
receiving, over the communication network from the forecast view user interface of the video content publisher device, the forecast for the video advertising campaign.

7. The method of claim 1, wherein the calculating the maximum prior impressions inventory is based on determining a lower value when comparing the maximum number of permitted impressions with a ratio of the maximum amount of permitted time to the run time of the video advertising campaign, and is further based on multiplying the count of the identified breaks by the lower value.

8. The method of claim 1, further comprising:
adjusting the future inventory based on at least one of an existing order line and a predicted order line resulting in a future availability.

9. The method of claim 8, further comprising:
representing at least one of the future inventory and the future availability as a number of impressions.

10. The method of claim 8, further comprising:
representing at least one of the future inventory and the future availability as an amount of time.

11. The method of claim 1, wherein the determining the signatures comprises identifying lines in the analyzable impression log comprising a criteria indicative of a break.

12. The method of claim 1, wherein the determining the configuration constraints comprises identifying at least one configuration comprising a targeting expression corresponding to the identified breaks.

13. The method of claim 1, further comprising:
analyzing the analyzable impression log to determine a count of previously viewed impressions;
determining an inventory of past impressions corresponding to previously viewed impressions, based on the count of identified breaks and the configuration constraints; and
calculating a quantity of unfilled impressions.

14. A system comprising:
a processing system comprising a processor; and
a memory storing executable instructions that cause the processing system to perform operations, the operations comprising:
receiving raw data associated with displayed video content over a communication network, wherein the raw data includes impressions observed by a viewer or times of the impressions served to the viewer;
storing, in an impression log data database, the raw data;
generating, by an impression log generator, an analyzable impression log from the raw data associated with the displayed video content presented to target viewers of video content having a group of viewer attributes, wherein the analyzable impression log includes the impressions observed by a target attribute including the viewer;
identifying signatures comprising lines within the analyzable impression log comprising a criteria indicative of breaks within the displayed video content resulting in identified breaks, wherein the identified breaks correspond to the times of the impressions served to the viewer either preceding or proceeding a segment associated with primary content;
determining configuration constraints associated with the identified breaks, wherein the configuration constraints comprise a maximum number of permitted impressions, and a maximum amount of permitted time for a permitted impression in each of the identified breaks;
calculating a maximum prior impressions inventory during a time period of the impression log based on the maximum number of permitted impressions, the maximum amount of permitted time for each permitted impression in each of the identified breaks, a count of the identified breaks, and a run time of a video advertising campaign;
based on the calculating of the maximum prior impressions inventory and based on a determination of a change in network traffic conditions in the communication network, forecasting, for the video advertising campaign, a future inventory of a product having a duration-based attribute; and causing display of the forecasted future inventory of a product having the duration-based attribute, using a forecast view user interface of a video content publisher device.

15. The system of claim 14, wherein the forecasting the future inventory comprises applying a multiplier to the maximum prior impressions inventory.

16. The system of claim 14, wherein the operations further comprise adjusting the forecasting of the future inventory according to a predetermined percentage of unfilled impressions in a same proportion as represented in the analyzable impression log.

17. The system of claim 14, wherein the calculating the maximum prior impressions inventory is based on determining a lower value when comparing the maximum number of permitted impressions with a ratio of the maximum amount of permitted time to the run time of the video advertising campaign, and is further based on multiplying the count of the identified breaks by the lower value.

18. The system of claim 14, wherein the operations further comprise:

adjusting the future inventory based on at least one of an existing order line and a predicted order line, resulting in a future availability.

19. A non-transitory, computer-readable storage medium having instructions stored thereon that, when executed by a data processing apparatus, cause the data processing apparatus to perform operations comprising:

receiving raw data associated with displayed video content over a communication network, wherein the raw data includes impressions observed by a viewer or times of the impression served to the viewer, storing, in an impression log data database, the raw data;

generating, by an impression log generator, an analyzable impression log from the raw data associated with the displayed video content presented to target viewers of video content having a group of viewer attributes, wherein the analyzable impression log includes the impressions observed by a target attribute including the viewer;

identifying signatures comprising lines within the analyzable impression log comprising a criteria indicative of breaks within the displayed video content, resulting in identified breaks, wherein the identified breaks correspond to the times of the impressions served to the viewer either preceding or proceeding a segment associated with primary content;

determining configuration constraints associated with the identified breaks, wherein the configuration constraints comprise a maximum number of permitted impressions, and a maximum amount of permitted time for a permitted impression in each of the identified breaks;

calculating a maximum prior impressions inventory during a time period of the impression log based on the maximum number of permitted impressions, the maximum amount of permitted time for each permitted impression in each of the identified breaks, a count of the identified breaks, and a run time of a video advertising campaign;

based on the calculating of the maximum prior impressions inventory, providing over the communication network a forecast for the video advertising campaign of a future inventory of a product having a duration-based attribute, wherein the forecast is based on a determination of a change in network traffic conditions; and causing display of the forecast for the video advertising campaign of the future inventory of a product having the duration-based attribute, using a forecast view user interface of a video content publisher device.

* * * * *